(12) United States Patent
Moyer et al.

(10) Patent No.: US 8,275,977 B2
(45) Date of Patent: Sep. 25, 2012

(54) DEBUG SIGNALING IN A MULTIPLE PROCESSOR DATA PROCESSING SYSTEM

(75) Inventors: William C. Moyer, Dripping Springs, TX (US); Jimmy Gumulja, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 730 days.

(21) Appl. No.: 12/420,521

(22) Filed: Apr. 8, 2009

(65) Prior Publication Data

US 2010/0262811 A1    Oct. 14, 2010

(51) Int. Cl.
*G06F 11/00* (2006.01)

(52) U.S. Cl. .......................................... 712/227; 714/25

(58) Field of Classification Search .................. 712/227; 714/25

See application file for complete search history.

(56) References Cited

U.S. PATENT DOCUMENTS

| | | | | |
|---|---|---|---|---|
| 5,313,618 A * | 5/1994 | Pawloski | ........................ | 703/28 |
| 5,452,437 A | 9/1995 | Richey et al. | | |
| 5,537,655 A * | 7/1996 | Truong | ............................ | 714/12 |
| 6,145,099 A * | 11/2000 | Shindou | ........................ | 714/37 |
| 6,145,100 A * | 11/2000 | Madduri | ........................ | 714/45 |
| 6,321,329 B1 * | 11/2001 | Jaggar et al. | .................... | 712/227 |
| 6,343,358 B1 * | 1/2002 | Jaggar et al. | .................... | 712/227 |
| 6,502,209 B1 * | 12/2002 | Bengtsson et al. | .............. | 714/35 |
| 6,675,334 B2 * | 1/2004 | Wadley | ........................... | 714/727 |
| 6,826,717 B1 | 11/2004 | Draper et al. | | |
| 6,993,674 B2 * | 1/2006 | Kitajima et al. | ................ | 713/601 |
| 7,055,117 B2 * | 5/2006 | Yee | ................................... | 716/113 |
| 7,162,410 B1 | 1/2007 | Nemecek et al. | | |
| 7,188,063 B1 | 3/2007 | Snyder | | |
| 7,219,265 B2 * | 5/2007 | Yee | ................................... | 714/30 |
| 7,236,921 B1 | 6/2007 | Nemecek et al. | | |
| 7,237,144 B2 * | 6/2007 | Safford et al. | ................... | 714/11 |
| 7,549,092 B2 * | 6/2009 | Jang | ................................ | 714/700 |
| 7,774,190 B1 * | 8/2010 | Nemecek | ........................ | 703/23 |
| 7,805,638 B2 * | 9/2010 | Jones et al. | ................... | 714/47.1 |
| 2005/0039074 A1 * | 2/2005 | Tremblay et al. | ................ | 714/11 |
| 2006/0161818 A1 * | 7/2006 | Tousek | ............................ | 714/45 |
| 2007/0130492 A1 | 6/2007 | Jamkhandi | | |
| 2007/0283061 A1 | 12/2007 | Mueller et al. | | |
| 2008/0126718 A1 | 5/2008 | Kottke et al. | | |
| 2008/0163035 A1 | 7/2008 | Kottke | | |
| 2008/0209251 A1 | 8/2008 | Kottke | | |
| 2008/0288758 A1 | 11/2008 | Mueller et al. | | |

OTHER PUBLICATIONS

U.S. Appl. No. 12/331,759, filed Dec. 10, 2008.
Internet data. eXpressDSP Software and Development Tools (-) http://focus/ti.com/lit/ml/sprue40/sprue40.pdf (2004).
PCT Application No. PCT/US2010/028300; Search Report and Written Opinion dated Nov. 3, 2010.

* cited by examiner

*Primary Examiner* — Aimee Li
(74) *Attorney, Agent, or Firm* — Joanna G. Chiu

(57) ABSTRACT

A system includes a first processor, a second processor, a first clock coupled to the first processor, and a third clock coupled to the first processor and to the second processor. The first processor includes debug circuitry coupled to receive the third clock, synchronization circuitry coupled to receive the first clock, wherein the synchronization circuitry receives a first request to enter a debug mode and provides a first synced debug entry request signal and wherein the first synced debug entry request signal is synchronized with respect to the first clock, and an input for receiving a second synced debug entry request signal from the second processor wherein the first processor waits to enter the debug mode until the first synced debug entry request signal and the second synced debug entry request signal are both asserted.

20 Claims, 10 Drawing Sheets

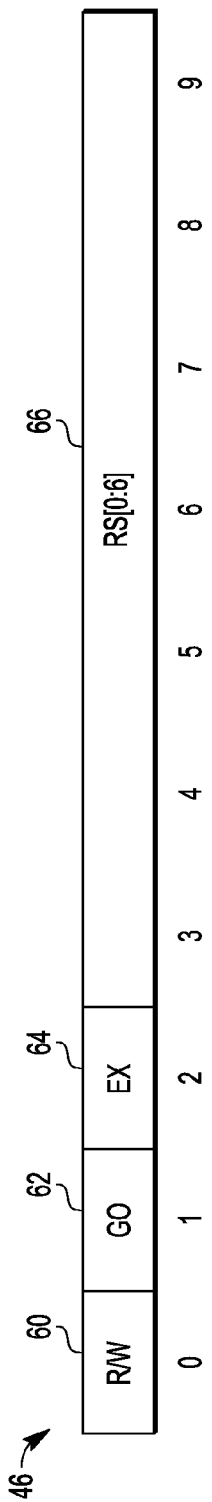
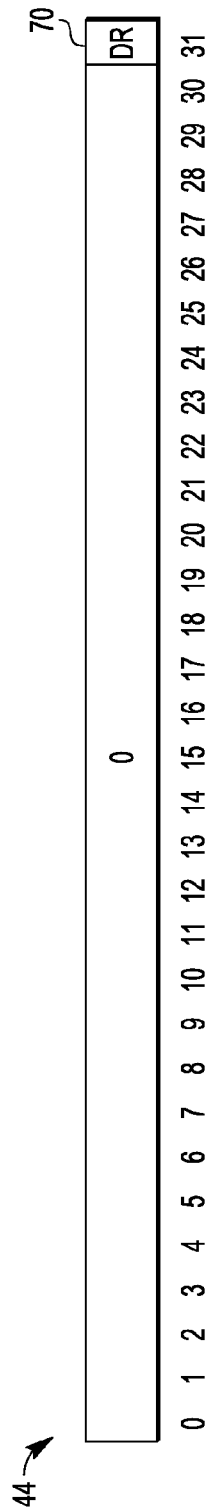
| BIT(S) | NAME | DESCRIPTION |
|---|---|---|
| 31 | DR | DEBUG REQUEST CONTROL BIT<br>THIS CONTROL BIT IS USED TO UNCONDITIONALLY REQUEST THE PROCESSOR TO ENTER THE DEBUG MODE.<br>0 - NO DEBUG MODE REQUEST<br>1 - UNCONDITIONAL DEBUG MODE REQUEST<br>WHEN THE DR BIT IS SET THE PROCESSOR WILL ENTER DEBUG MODE AT THE NEXT INSTRUCTION BOUNDARY. |
FIG. 6

| BIT(S) | NAME | DESCRIPTION |
|---|---|---|
| 0 | RW | READ/WRITE COMMAND BIT<br>THE RW BIT SPECIFIES THE DIRECTION OF DATA TRANSFER.<br>  0 - WRITE THE DATA ASSOCIATED WITH THE COMMAND INTO THE REGISTER SPECIFIED BY RS[0:6]<br>  1 - READ THE DATA CONTAINED IN THE REGISTER SPECIFIED BY RS[0:6] |
| 1 | GO | GO COMMAND BIT<br>  0 - INACTIVE (NO ACTION TAKEN)<br>  1 - EXECUTIVE INSTRUCTION IN IR<br>IF THE GO BIT IS SET, THE CHIP WILL EXECUTE THE INSTRUCTIONS WHICH RESIDES IN THE IR REGISTER. TO EXECUTE THE INSTRUCTION, THE PROCESSOR LEAVES THE DEBUG MODE, EXECUTES THE INSTRUCTION, AND IF THE EX BIT IS CLEARED, RETURNS TO THE DEBUG MODE IMMEDIATELY AFTER EXECUTING THE INSTRUCTION. THE PROCESSOR GOES ON TO NORMAL OPERATION IF THE EX BIT IS SET, AND NO OTHER DEBUG REQUEST SOURCE IS ASSERTED. |
| 2 | EX | EXIT COMMAND BIT<br>  0 - REMAIN IN DEBUG MODE<br>  1 - LEAVE DEBUG MODE<br>IF THE EX BIT IS SET, THE PROCESSOR WILL LEAVE THE DEBUG MODE AN RESUME NORMAL OPERATION UNTIL ANOTHER DEBUG REQUEST IS GENERATED. |
| 3:9 | RS | REGISTER SELECT<br>THE REGISTER SELECT BITS DEFINE WHICH REGISTER IS SOURCE (DESTINATION) FOR THE READ (WRITE) OPERATION. |

FIG. 4

DEBUG SIGNALING IN A MULTIPLE PROCESSOR DATA PROCESSING SYSTEM

BACKGROUND

1. Field

This disclosure relates generally to data processing, and more specifically, to debug signaling in a multiple processor data processing system.

2. Related Art

Some applications for integrated circuit data processing systems require a higher than average level of reliability. For example, fly-by-wire, anti-lock braking, automobile airbags, and other systems where a failure can result in injury, are examples of systems that require highly reliable operation.

There are many ways to improve reliability. For example, in a memory, reliability can be improved by adding redundant components that take over when the primary components fail. In a multi-processor system, better reliability has been achieved by running multiple processors in "lockstep". When two or more processors are running in lockstep, each processor is executing the same instruction stream at the same time or within a predetermined skew of each other (i.e. within a predetermined number of clocks of each other). Issues arise, however, when debugging such a multiple processor system. For example, the asynchronous nature of a debug port relative to the processor clock domain of one or more processors within the multiple processor system may cause issues with remaining in lockstep, since the action of one processor may be different following synchronization of debug entry and exit commands. That is, another processor within the multiple processor system may not synchronize the debug entry and exit commands at a same clock cycle, and thus may incur a delay in seeing the debug mode entry or exit, resulting in the loss of lockstep.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 illustrates, in diagrammatic form, a debug command register of the debug control of FIG. 2, in accordance with an embodiment.

FIG. 4 illustrates, in table form, a description of various fields of the debug command register of FIG. 3, in accordance with an embodiment.

FIG. 5 illustrates, in diagrammatic form, a debug control register of the debug control of FIG. 2, in accordance with an embodiment.

FIG. 6 illustrates, in table form, a description of a field of the debug control register of FIG. 5, in accordance with an embodiment.

DETAILED DESCRIPTION

Figure 1:
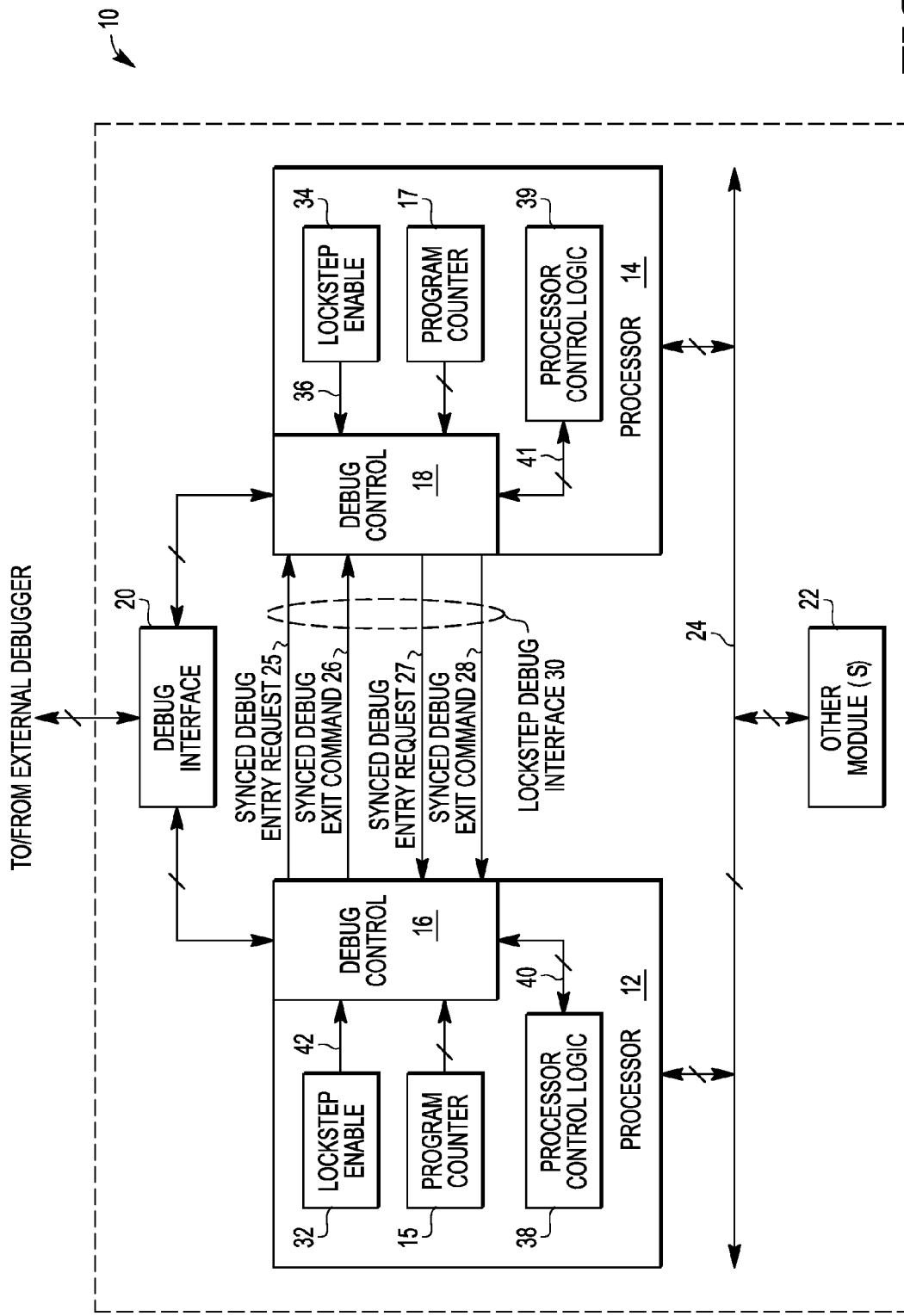
FIG. 1 illustrates, in block diagram form, a multi-processor system in accordance with an embodiment.

Generally, there is provided, a multiple processor data processing system where multiple processors, cores, or central processing units (CPUs), operate in a synchronized manner, such as in lockstep. However, due to the asynchronous nature of debug activities, such as entry into and exit from debug mode, lockstep may be lost. For example, when running a pair of processors in lockstep, synchronization circuitry is used in each processor to ensure that asynchronous inputs are synchronized with respect to the processor's clocks. However, due to the possible metastability which may occur within such synchronization circuitry, the synchronized outputs of the synchronization circuitry in each of the two processors may actually differ, causing a loss of lockstep operation when performing debug operations using a debug control interface which operates asynchronously to the processor clock. In this case, the debugger needs to account for this loss of lockstep and attempt to re-synchronize. Therefore, in one embodiment, a cross-signaling interface, such as a lockstep debug interface, is used to force entry and exit from debug modes to be coordinated between the processors (e.g. to ensure both processors enter or exit debug mode at a same time or within a predetermined number of clock cycles of each other). In one embodiment, the cross-signaling ensures that the processors will remain in lockstep by conditionally delaying debug entry and exit in one processor until the other processor has seen the same request. In a system which includes more than two processors, the cross-signaling may be used to conditionally delay debug entry and exit in one processor until all the other processors have seen the same requests. Also, in one embodiment, this cross-signaling interface is used conditionally based upon whether the processors are actually operating in a lockstep mode or not.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or the letter "B" following the signal name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

FIG. 1 illustrates, in block diagram form, a simplified view of a data processing system 10 in accordance with an embodiment. System 10 includes processor 12, processor 14, other module(s) 22, system interconnect 24, and debug interface 20. Processor 12 includes debug control 16, lockstep mode enable 32, program counter 15, and processor control logic 38. Each of lockstep mode enable 32, program counter 15, and processor control logic 38 are coupled to debug control 16. Lockstep mode enable 32 provides a lockstep mode indicator 42 to debug control 16, and processor control logic 38 communicates with debug control 16 via signals 40. Processor 14 includes debug control 18, lockstep mode enable 34, program counter 17, and processor control logic 39. Each of lockstep mode enable 34, program counter 17, and processor control logic 39 are coupled to debug control 18. Lockstep mode enable 34 provides a lockstep mode indicator 36 to debug control 18, and processor control logic 39 communicates with debug control 18 via signals 41. In the illustrated embodiment, processors 12 and 14 are substantially identical and can be any type of processor, such as, for example, a general purpose processor, a digital signal processor (DSP), etc. In other embodiments, processors 12 and 14 can be different from each other. For example, processor 12 may be a general purpose processor and processor 14 may be a DSP. Also, even though only two processors are shown, those skilled in the art will know that the described embodiments are also applicable to systems having more than two processors. In addition, in other embodiments, processors 12 and 14 may include different logic blocks than those depicted, or there may be additional logic blocks not illustrated in FIG. 1. For example, each of processors 12 and 14 may include one or more execution units, an instruction fetch unit, an instruction decode unit, a bus interface unit, etc., which may all be coupled to the processor control logic of the respective processor. Therefore, processing control logic 38 and 39 can control operation of processor 12 and 14, respectively. Operation of processors 12 and 14 is known in the art and therefore will only be discussed to the extent necessary to describe embodiments of the present invention.

Processors 12 and 14 and other module(s) 22 (if any) are bi-directionally coupled to system interconnect 24. Note, there may be additional functional blocks coupled to system interconnect 24 that are not illustrated in FIG. 1. In one embodiment, system interconnect 24 may be characterized as a bus comprising a plurality of conductors coupled to each block of the system. In another embodiment, system interconnect 24 may be a conventional "cross-bar" type bus that allows simultaneous communications between system blocks. In another embodiment, system interconnect 24 may be an Advanced High-performance Bus (AHB). AHB is a bus protocol introduced in AMBA Specification version 2 published by ARM Ltd Company. In yet another embodiment, system interconnect 24 may be another type of system interconnection system.

System 10 includes a lockstep debug interface 30 between debug control 16 in processor 12 and debug control 18 in processor 14. In one embodiment, lockstep debug interface 30 includes the following signals: a synced debug entry request 25 provided from debug control 16 to debug control 18, a synced debug exit command 26 provided from debug control 16 to debug control 18, a synced debug entry request 27 provided from debug control 18 to debug control 16, and a synced debug exit command 28 from debug control 18 to debug control 16. Note that additional signals may be present between debug controls 16 and 18. Debug interface 20 interfaces between debug controls 16 and 18 and an external debugger (not shown). For example, in one embodiment, debug interface 20 may be a JTAG port, or at least a portion thereof. Debug interface 20 may communicate debug commands and results between an external debugger and the debug controls located in respective processors of system 10.

In operation, processors 12 and 14 operate using a same processor clock, PCLK 54 (not illustrated in FIG. 1), and are capable of operating in lockstep with each other. In one embodiment, a lockstep mode enable in each of processor 12 and 14 can be asserted to enable lockstep mode. In one embodiment, lockstep mode is enabled in response to a system signal provided by circuitry (not shown) within system 10, either internal to or external to processors 12 and 14. In an alternate embodiment, processors 12 and 14 may always operate in lockstep. When processors 12 and 14 are running in lockstep, each processor is executing the same instruction stream at the same time or within a predetermined skew of each other (i.e. within a predetermined number of clocks of each other). For example, in one embodiment, when running in lockstep, execution of a same instruction in processor 14 is skewed by ten or less cycles of PCLK as compared to execution of the same instruction in processor 12. Also, when processors 12 and 14 are running in lockstep mode (even when in debug mode), each processor is updating its corresponding program counter (program counter 15 and program counter 17, respectively) at a same time.

When running in lockstep, debug commands can be provided from the external debugger to debug control 16 and 18 via debug interface 20. In response to these debug commands, each of processor 12 and processor 14 may enter debug mode. However, in order to remain running in lockstep, processor 12 and processor 14 should enter debug mode at a same time or within a predetermined number of clocks of each other. In some embodiments, debug interface 20 operates using a clock, such as TCLK 56, which is asynchronous with respect to the clock(s) used by processors 12 and 14, and may also be of a different frequency, such as a much lower frequency in one embodiment. Therefore, in one embodiment, when needing to enter into debug mode, each processor waits until it has seen the debug command and is ready to enter debug mode and the other processor has seen the same debug command and is also ready to enter debug mode. Therefore, in one embodiment, when a processor is ready to enter a debug mode, the debug control of that processor asserts the synced debug entry request signal so that the other processor may know when it is ready to enter debug mode. In this manner, a processor will wait to enter debug mode until the other processor is also ready to do so. A similar discussion applies to exiting debug mode, where when a processor is to exit debug mode, the debug control of that processor asserts the synced debug exit command signal so that the other processor may know when that processor is ready to exit debug mode. Further details of operation will be described in reference to the FIGS. 2-12 below.

Figure 2:
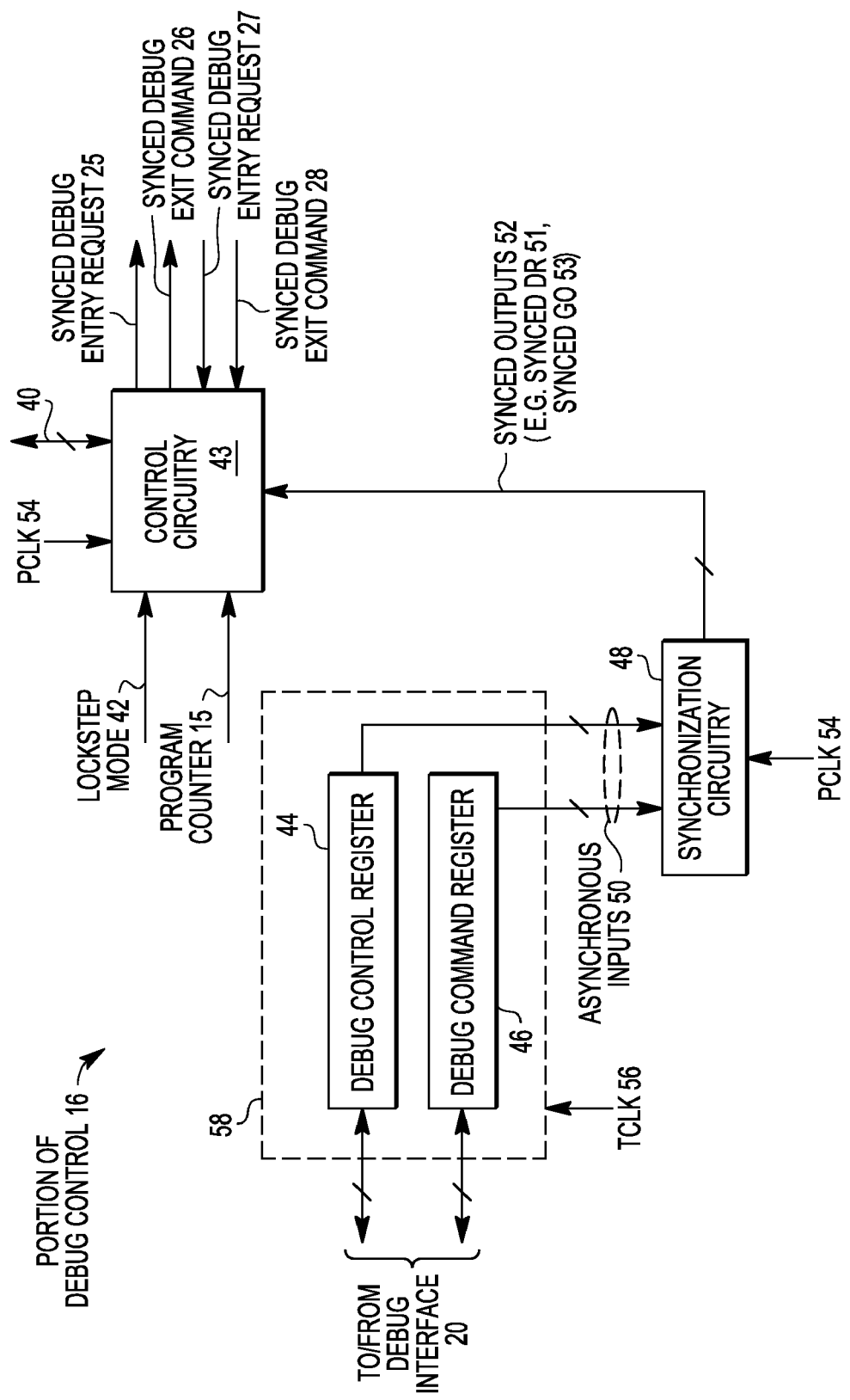
FIG. 2 illustrates, in block diagram form, a portion of a debug control of a processor within the multiple processor system of FIG. 1, in accordance with an embodiment.

FIG. 2 illustrates, in block diagram form, a portion of debug control 16. Debug control 16 includes control circuitry 43, synchronization circuitry 48, a debug control register 44, and a debug command register 46. Control circuitry 43 receives lockstep mode indicator 42, program counter 15, PCLK 54, synced debug entry request 27 from processor 14, synced debug exit command 28 from processor 14, and synced outputs 52 from synchronization circuitry 48. Note that synchronization outputs 52 may include a synced DR 51 and a synced GO 53. Control circuitry 43 also communicates with processor control logic 38 via signals 40. Synchronization circuitry 48 receives PCLK 54 and provides synced outputs 52 to control circuitry 43. Debug control register 44 and debug command register 46 communicate with debug interface 20 and provide asynchronous inputs 50 to synchronization circuitry 48. Debug circuitry 58 includes debug control register 44 and debug command register 46 and receives a test clock (TCLK) 56. Therefore, note that debug circuitry 58 operates according to TCLK 56 which may be asynchronous with respect to PCLK 54. Therefore, asynchronous inputs 50 may be asynchronous with respect to PCLK 54. However, alternatively, TCLK 56 may be synchronous with respect to PCLK 54. Also, the inputs coming in from debug interface 20 may be asynchronous to PCLK 54. Therefore, note that a first portion of debug circuitry (such as debug circuitry 58) can operate using a first clock (such as TCLK 56) while a second portion of debug circuitry (such as synchronization circuitry 48 and control circuitry 43) can operate using a second clock (such as PCLK 54) that is asynchronous to the first clock. Operation of FIG. 2 will be described in more detail after discussing debug control register 44 and debug command register 46 in reference to FIGS. 3-6.

FIG. 3 illustrates debug command register 46 in accordance with one embodiment of the present invention. Debug command register 46 includes a R/W field 60 for storing a read/write command bit, a GO field 62 for storing a go command bit, an EX field 64 for storing an exit command bit, and an RS field 66 for storing a register select indicator. FIG. 4 illustrates a table describing operation of each field in debug command register 46. The read/write command bit specifies the direction of data transfer. For example, when R/W 60 is cleared to a logic level 0, the data associated with the command is written into the register specified by RS 66, and when set to a logic level 1, the data contained in the register specified by RS 66 is read. When GO 62 is cleared to a logic level 0, no action is taken. When GO 62 is set to a logic level one, the instruction in the instruction register (IR) (within processor 12) is executed. To execute the instruction, processor 12 leaves debug mode and executes the instruction. If EX 64 is cleared to a logic level 0, processor 12 returns to debug mode immediately after executing the instruction. Processor 12 goes on to normal operation if EX 64 is set to a logic level one and no other debug request source is asserted. Therefore, if EX 64 is set to a logic level one, processor 12 will leave the debug mode and resume normal operation until another debug request is generated.

FIG. 5 illustrates debug control register 44 in accordance with one embodiment of the present invention. Debug control register 44 includes a DR field 70 for storing a debug request control bit. FIG. 6 illustrates a table describing operation of DR 70. DR 70 is used to unconditionally request processor 12 to enter the debug mode. Therefore, when DR 70 is cleared to a logic level 0, no debug mode request is made, and when set to a logic level one, processor 12 will enter debug mode at the next instruction boundary.

Note that debug command register 46 and debug control register 44 may be implemented using one or more registers, each register having any number of fields, each field having any number of bits and organized in any manner.

Therefore, referring back to FIG. 2, debug interface 20 may set or clear the fields of registers 44 and 46 to generate a request to enter debug mode or cause an exit from debug mode in response, for example, to commands from the external debugger. Since debug circuitry 58 operates according to TCLK 56, the fields of registers 44 and 46, in response to commands from debug interface 20, are updated according to TCLK 56 (e.g. in response to a rising or falling edge of TCLK 56). Synchronization circuitry 48 receives asynchronous inputs 50 from registers 44 and 46. For example, when DR 70 or GO 62 are set or cleared, they are received as inputs by synchronization circuitry 48. Since these bits are set or cleared synchronous to TCLK 56, they may be asynchronous with respect to PCLK 54. Synchronization circuitry 48, which operates according to PCLK 54, synchronizes DR 70 and GO 62 to PCLK 54 to produce a synced version of DR 70, synced DR 51, and a synced version of GO 62, synced GO 53, which are each synced (i.e. synchronized) to PCLK 54. Therefore, synchronization circuitry 48 operates to synchronize asynchronous inputs 50 received from debug circuitry 58 to provide corresponding synced outputs 52 (where synced DR 51 and synced GO 53 may be included in synced outputs 52) to control circuitry 43.

Using these synced outputs, control circuitry 43 can appropriately alert processor 14 that it is synchronized and ready to take the appropriate action (such as exit or enter debug mode). For example, in response to assertion of DR 70 to enter debug mode, synchronization circuitry 48 provides synced DR 51 to control circuitry 43. At this point, processor 12 may be considered ready to enter debug mode. Therefore, control circuitry 43, in response to assertion of synced DR 51, can provide synced debug entry request 25 to debug control 18 of processor 14 to indicate to debug control 18 that processor 12 is ready to enter debug mode. However, processor 12 will not enter debug mode until an asserted synced debug entry request 27 from debug control 18 of processor 14 is received, indicating that processor 14 has also received the request to enter debug mode (such as via assertion of the DR bit of its corresponding debug control register) and is also ready, in response thereto, to enter debug mode. Therefore, processor 12 will not enter debug mode until processor 14 is also ready to enter debug mode, and vice versa. In this manner, both processors can enter debug mode in a lockstep fashion, i.e. at the same time. Processor 14 will likewise not enter debug mode until processor 12 alerts processor 14 that it is ready to enter debug mode and processor 14 itself is also ready to enter debug mode.

Similar operation applies to exiting debug mode. For example, in response to assertion of GO 62 to exit debug mode, synchronization circuitry 48 provides synced GO 53 to control circuitry 43. At this point, processor 12 may be considered ready to exit debug mode. Therefore, control circuitry 43, in response to assertion of synced GO 53, can provide synced debug exit command 26 to debug control 18 or processor 14 to indicate to debug control 18 that processor 12 is ready to exit debug mode. However, processor 12 will not exit debug mode until an asserted synced debug exit command 27 from debug control 18 of processor 14 is received, indicating that processor 14 has also received the command to exit debug mode (such as via assertion of the GO bit of its corresponding debug command register) and is also ready, in response thereto, to exit debug mode. Therefore, processor 12 will not exit debug mode until processor 14 is also ready to exit debug mode, and vice versa. In this manner, both processors can exit debug mode in a lockstep fashion, i.e. at the same time. Processor 14 will likewise not exit debug mode until processor 12 alerts processor 14 that it is ready to exit debug mode and processor 14 itself is also ready to exit debug mode.

In one embodiment, once processor 12 and processor 14 are in a debug mode, subsequent operations requested by the external debugger via debug interface 20 may be performed using the TCLK 56 clock in both processors, such that synchronization of those operations and the subsequent handshaking of events is not required between processor 12 and processor 14, thus simplifying communications. In an alternate embodiment, the processor clock PCLK 54 may be used to perform the requested operations in both processors, or PCLK 54 may be switched to an alternate clock which is synchronous to control 58 within debug control 16, thus avoiding any need for further synchronization of control signaling. This clock handoff between a debug or test clock and the normal processor clock may allow for a great degree of signaling simplification in some embodiments.

Note that, in one embodiment, synced debug entry request 25 is a delayed version of synced DR 51 (delayed, for example, due to propagation through combinational or sequential logic). That is, synced debug entry request 25 may be the same signal as synced DR 51, only delayed by one or more clock cycles of PCLK 54. That is, synced DR 51 and synced debug entry request signal 25 are both asserted in response to the same event (i.e. they are both asserted in response to synchronization circuitry 48 synchronizing a request to enter debug mode received via debug circuitry 58). The same may be the case for synced debug exit command 26 in that it may simply be a delayed version of synced GO 53. That is, synced GO 53 and synced debug exit request signal 26 are both asserted in response to the same event (i.e. they are both asserted in response to synchronization circuitry 48 synchronizing a command to exit debug mode received via debug circuitry 58.)

Also, note that any portion of synced DR 51 output by synchronization circuitry 48 or any portion of synced debug entry request 25 may be used as the synced debug entry request signal that determines when processor 12 enters debug mode. For example, in one embodiment, processor 12 will wait to enter debug mode until synced DR 51 and synced debug entry request 27 received from processor 14 are both asserted. In an alternate embodiment, processor 12 will wait to enter debug mode until synced debug entry 25 and synced debug entry request signal 27 received from processor 14 are both asserted. Therefore, since synced DR 52 and synced debug entry request 25 are both asserted in response to the same event, as described above, note that either synced DR 51 or synced debug entry request 25 may be used as a synced debug entry request signal that is used by processor 12 in determining when to enter debug mode. Similarly, for alternate embodiments, any portion of synced GO 53 output by synchronization circuitry 48 or any portion of synced debug exit command 26 may be used as a synced debug exit command signal that determines when processor 12 exits debug mode.

Still referring to FIG. 2, note that any type of known synchronization circuitry may be used to synchronize inputs 50 to PCLK 54. For example, in one embodiment, for each input and corresponding output, synchronization circuitry may include a number of series-connected D-type flip flops which are clocked by PCLK 54. The asynchronous input may be provided at the data input of the first series-connected flip flop, and the corresponding synchronous output may be provided at the data output of the last series-connected flip flop, where the data output would then be synchronized with respect to PCLK 54. For example, in one embodiment, each of DR 70 and GO 62 can be provided to a series of three D-type flip flops connected in series, where a data input of the first flip flop in the series receives DR 70 or GO 62 and the data output of the third and last flip flop in the series provides synced DR 51 or synced GO 53, respectively. Alternatively, any number of flip flops may be used, or other types of synchronization circuitry may be used.

In one embodiment, debug control circuitry 18 is the same as debug control circuitry 16, and includes control circuitry, synchronization circuitry, a debug control register, and a debug command register which are coupled in the same manner and operate in the same manner as in debug control circuitry 16. Therefore, in this embodiment, the same descriptions provided above with respect to debug control circuitry 16 and processor 12 also apply analogously to debug control circuitry 18 and processor 14. The DR bit of debug control register and the GO bit of debug command register of debug control circuitry 18 would also be asserted or negated via debug interface 20. For some embodiments, a first request to have processor 12 enter debug mode (e.g. by asserting DR 50 in processor 12) may be considered the same request to enter debug mode as a second request to have processor 14 enter debug mode (e.g. by asserting the DR bit in processor 14). However, alternate embodiments may instead consider such requests to multiple processors as a plurality of distinct requests since a plurality of processors are involved. Analogous to processor 12, processor 14 would not enter or exit debug mode until it is ready to do so (indicated by assertion of its synced DR or synced GO signals) and it has received an asserted synced debug entry request 27 or synced debug exit command 28, respectively, from processor 12. In one embodiment, both processor 12 and 14 operate according to a same processor clock, such as PCLK 54, where the asynchronous portion of the debug circuitry of each processor 12 and 14 operates according to a same test clock, such as TCLK 56. However, in an alternate embodiment, a third clock may be used for processor 14, such that processor 14 may operate according to its own processor clock which may or may not be the same as PCLK 54 used by processor 12.

In one embodiment, even though the DR or GO bits of the corresponding debug control circuitry of each processor may be set or cleared at the same time by debug interface 20, synced outputs from synchronization circuitry 48 of processor 12 and the synced outputs from synchronization circuitry of processor 14 may not be provided at the same time. Even if the synchronization circuitries of processor 12 and 14 are identical, based on various factors, one may take a cycle or more longer to synchronize the inputs to provide synced outputs. If each processor were to simply rely on the output of their respective synchronization circuitry to enter or exit debug mode, without receiving any indication from the other processor as to whether they are ready to enter or exit debug mode, it is possible that the two processors enter or exit debug mode a cycle or more off, due to the difference in synchronization time, thus resulting in loss of lockstep. Therefore, by including lockstep debug interface 30 and using these signals to delay entry into or exit from debug mode until the other lockstep processors in the system are ready to do the same, as was described above, loss of lockstep can be prevented. In alternate embodiments, in which different types of synchronization circuitries are used in each processor, the use of a lockstep debug interface as described above may also help prevent loss of lockstep.

Also, in one embodiment, lockstep debug interface 30 is only used or the entry into or exit from debug mode is only delayed when processors 12 and 14 are operating in lockstep mode, as indicated to the debug control circuitry of each processor by their corresponding lockstep mode enable indicator. Note that, in some embodiments, processors 12 and 14, when operating in lockstep mode, operate with a delay between the two processors (a predetermined clock skew), and the operations may not occur on the same clock cycle. Otherwise, when lockstep mode is not enabled, each processor can enter into or exit from debug mode upon the corresponding control circuitry receiving the synced DR or GO command from its corresponding synchronization circuitry. That is, when processors 12 and 14 are not operating in lockstep mode, the operate in independent mode where they function as separate, independent processors.

Operation of system 10 will be further discussed in reference to the timing diagrams of FIGS. 7-12 below. However, the same descriptions could also apply to any processor within system 10. In each of the timing diagrams, PCLK 54 and TCLK 56 are provided as the first two signals. (Also, note that the program counter values used in each of FIGS. 7-12 for program counter 15 and program counter 17 are in hexadecimal format.)

Figure 7:
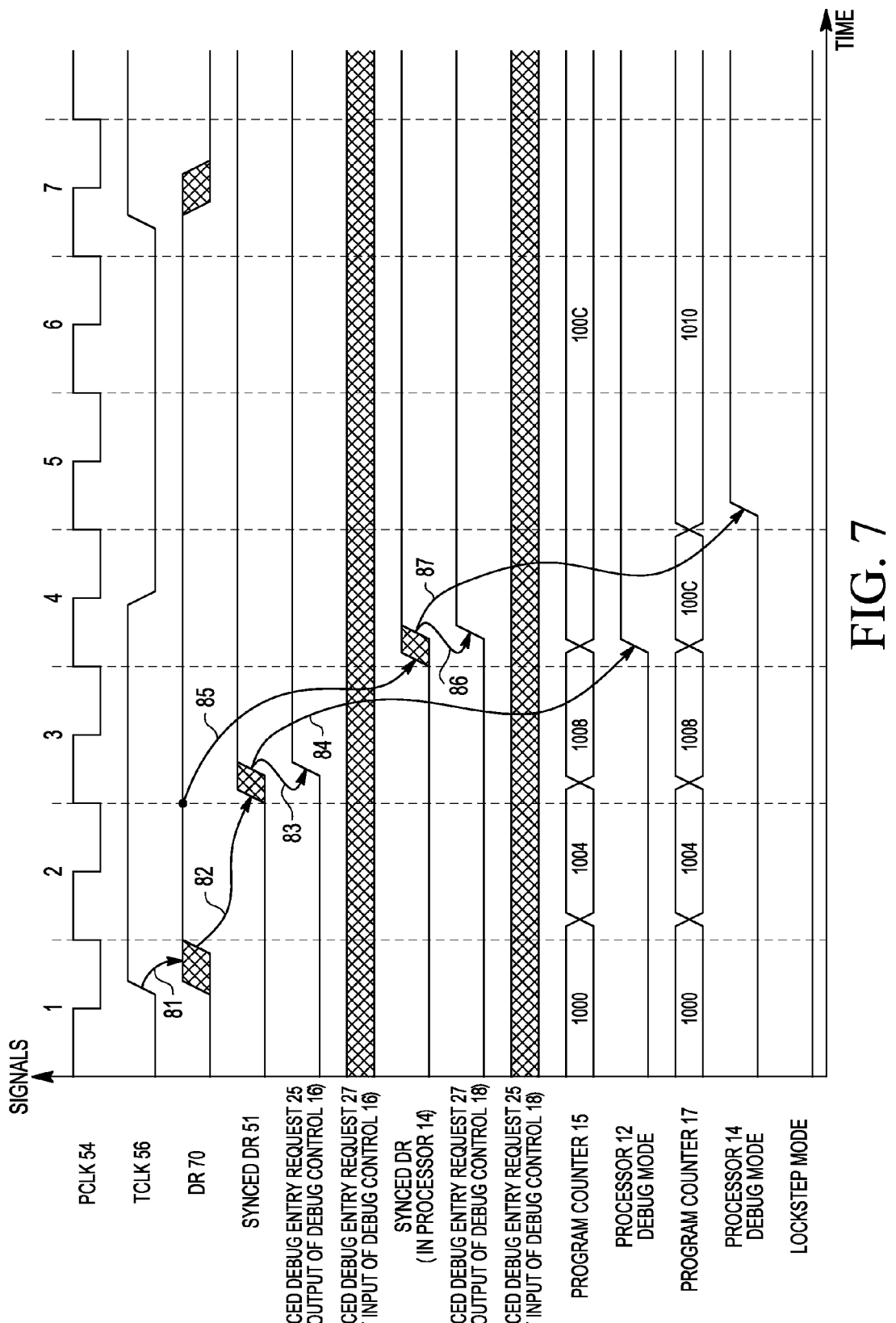
FIG. 7 illustrates a timing diagram of various signals of FIG. 1 or FIG. 2 in accordance with one example of debug entry signaling in a non-lockstep mode.

FIG. 7 illustrates an example timing for entry into debug mode with lockstep operation disabled. Therefore, the last signal in FIG. 7, lockstep mode, is negated. In this example, entry into debug mode is requested by the assertion of DR 70 (where, the DR bit of processor 14 may also be simultaneously asserted). The assertion of DR 70 occurs during cycle 1 in response to a rising edge of TCLK 56, as illustrated by arrow 81. At this point, DR 70 is asynchronous with respect to PCLK 54. DR 70 is then synchronized to PCLK 54 (by synchronization circuitry 48), resulting in synced DR 51 in cycle 3, illustrated by arrow 82. Control circuitry 43, in response to the assertion of synced DR 51, asserts synced debug entry request 25 (which is output from debug control 16) later in cycle 3, as illustrated by arrow 83. Also, in response to assertion of synced DR 51, processor 12, in cycle 4, enters debug mode, as illustrated by arrow 84. (Note that when the debug mode signal is at a logic level 1, processor 12 is in debug mode, and when at a logic level 0, processor 12 is not in debug mode.) As described above, since the relationship between PCLK 54 and TCLK 56 is not fixed, it is possible for the synchronized versions of DR (synced DR) to differ in processor 12 and 14. Therefore, even though the DR bit of processor 14 may be set simultaneous to DR 70, synced DR of processor 14 may not be output by the synchronization circuitry of processor 14 until cycle 4, as illustrated by arrow 85, which is one cycle later than when synced DR 51 was provided in processor 12. Later in cycle 4, as illustrated by arrow 86, the control circuitry of processor 14 asserts synced debug entry request 27 (at the output of debug control 18). Also, in response to assertion of the synced DR in cycle 4, processor 14, in cycle 5, enters debug mode, as illustrated by arrow 87. Therefore, note that, in this example, processor 14 enters debug mode one cycle later than processor 12. However, since lockstep mode is not enabled, the interface signal at the input of debug control 16 (synced debug entry request 27) and the interface signal at the input of debug control 18 (synced debug entry request 25) are ignored, and thus do not condition entry into debug mode by the processors. Therefore, the program counter of each processor end up with different values while in debug mode (as can be seen in cycles 6 and 7), thus processors 12 and 14 are now out of sync.

Figure 8:
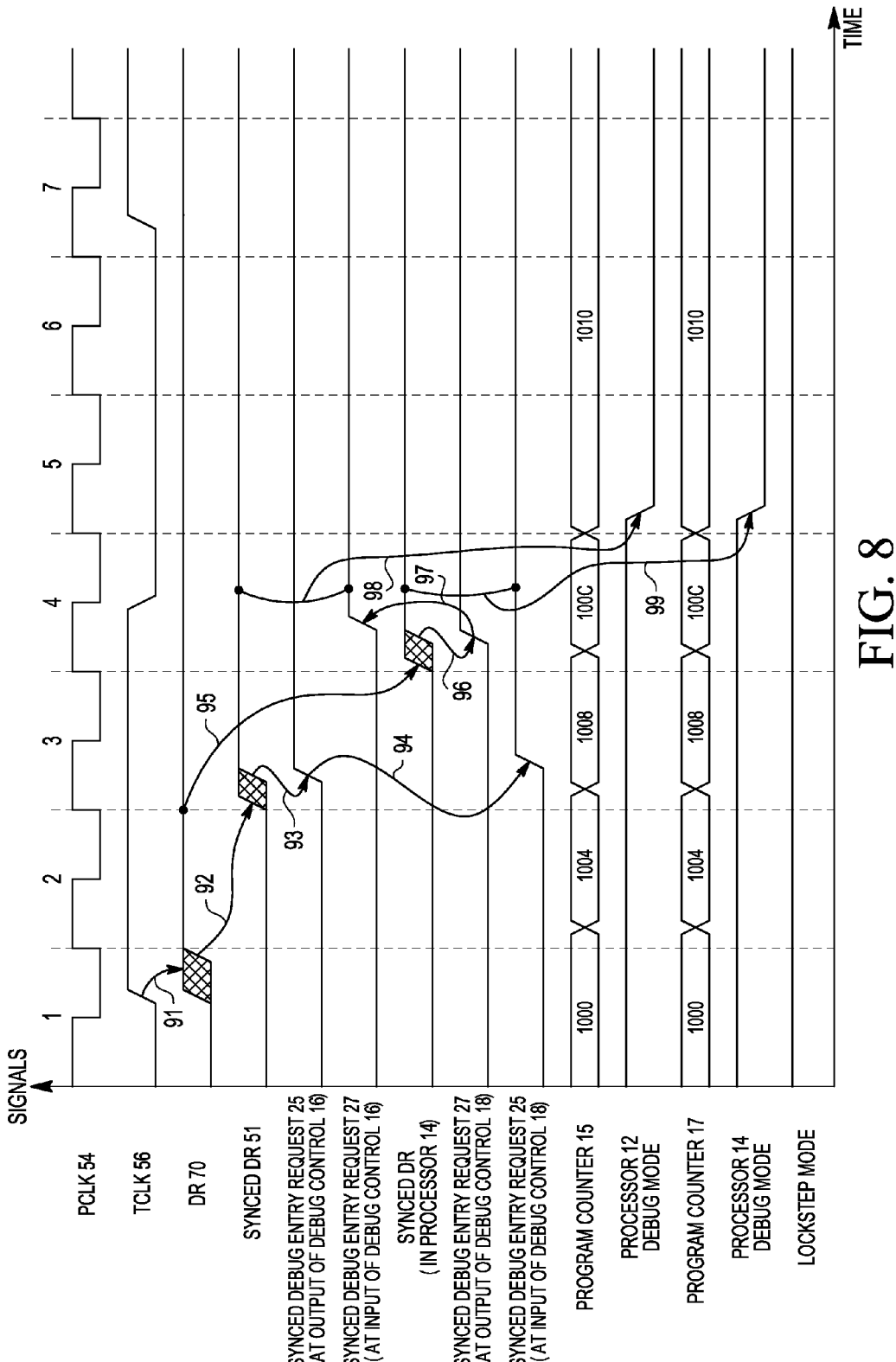
FIG. 8 illustrates a timing diagram of various signals of FIG. 1 or FIG. 2 in accordance with one example of debug entry signaling in a lockstep mode.

FIG. 8 illustrates an example timing for entry into debug mode with lockstep operation enabled. Therefore, the last signal in FIG. 8, lockstep mode, is asserted. In this example, entry into debug mode is requested by the assertion of DR 70 (where, the DR bit of processor 14 may also be simultaneously asserted). The assertion of DR 70 occurs during cycle 1 in response to a rising edge of TCLK 56, as illustrated by arrow 91. At this point, DR 70 is asynchronous with respect to PCLK 54. DR 70 is then synchronized to PCLK 54 (by synchronization circuitry 48), resulting in synced DR 51 in cycle 3, illustrated by arrow 92. Control circuitry 43, in response to the assertion of synced DR 51, asserts synced debug entry request 25 (which is output from debug control 16) later in cycle 3, as illustrated by arrow 93. This assertion of synced debug entry request 25 then propagates to the input of debug control 18, as illustrated by arrow 94. As described above, since the relationship between PCLK 54 and TCLK 56 is not fixed, it is possible for the synchronized versions of DR (synced DR) to differ in processor 12 and 14. Therefore, even though the DR bit of processor 14 may be set simultaneous to DR 70, synced DR of processor 14 may not be output by the synchronization circuitry of processor 14 until cycle 4, as illustrated by arrow 95, which is one cycle later than when synced DR 51 was provided in processor 12. Later in cycle 4, as illustrated by arrow 96, the control circuitry of processor 14 asserts synced debug entry request 27 (at the output of debug control 18). This assertion of synced debug entry request 27 then propagates to the input of debug control 16, as illustrated by arrow 97.

Unlike in FIG. 7, in which processor 12 enters debug mode in cycle 4 in response to assertion of synced DR 51, processor 12 delays entry into debug mode until both assertion of synced DR 51 occurs and assertion of synced debug entry request 27 is received, as illustrated by arrow 98. Therefore, processor 12 delays entry into debug mode until cycle 5 rather than entering in cycle 4 as was done in FIG. 7. Similarly, processor 14 enters debug mode when both assertion of its synced DR occurs and assertion of synced debug entry request 25 is received, as illustrated by arrow 99. Therefore, processor 14 also enters debug mode in cycle 5. Thus, both processors remain in sync, without loss of lockstep. Therefore, through the use of the synced debug entry request signals, lockstep can be maintained. In contrast to the example in FIG. 7, the program counter values for processor 12 and processor 14 are the same value while in debug mode, as shown in cycles 5-7.

Figure 9:
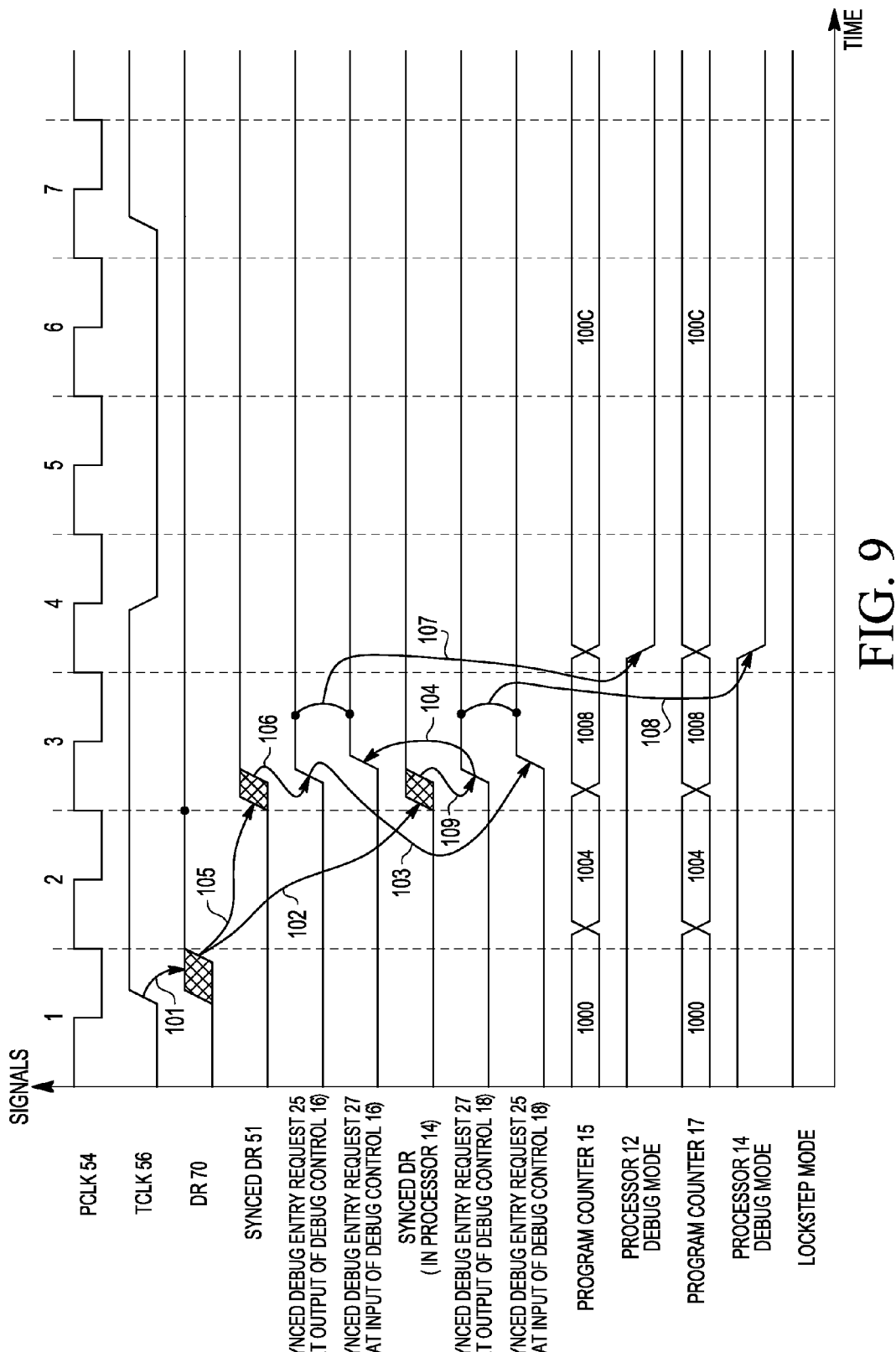
FIG. 9 illustrates a timing diagram of various signals of FIG. 1 or FIG. 2 in accordance with another example of debug entry signaling in a lockstep mode.

FIG. 9 illustrates another example timing for entry into debug mode with lockstep operation enabled. Therefore, the last signal in FIG. 9, lockstep mode, is asserted. In this example, entry into debug mode is requested by the assertion of DR 70 (where, the DR bit of processor 14 may also be simultaneously asserted). The assertion of DR 70 occurs during cycle 1 in response to a rising edge of TCLK 56, as illustrated by arrow 101. At this point, DR 70 is asynchronous with respect to PCLK 54. DR 70 is then synchronized to PCLK 54 (by synchronization circuitry 48), resulting in synced DR 51 in cycle 3, illustrated by arrow 105. Control circuitry 43, in response to the assertion of synced DR 51, asserts synced debug entry request 25 (which is output from debug control 16) later in cycle 3, as illustrated by arrow 106. This assertion of synced debug entry request 25 then propagates to the input of debug control 18, as illustrated by arrow 103. As described above, since the relationship between PCLK 54 and TCLK 56 is not fixed, it is possible for the synchronized versions of DR (synced DR) to differ in processor 12 and 14. However, in FIG. 9, the synced DR of processor 14 is also output by the synchronization circuitry of processor 14 in cycle 4, as illustrated by arrow 102. Later in cycle 3, as illustrated by arrow 109, the control circuitry of processor 14 asserts synced debug entry request 27 (at the output of debug control 18). This assertion of synced debug entry request 27 then propagates to the input of debug control 16, as illustrated by arrow 104.

Still referring to FIG. 9, processor 12 enters debug mode when both synced debug entry request 25 is asserted at the output of debug control 16 and an asserted synced debug entry request 27 is received by debug control 16, as illustrated by arrow 107. Similarly, processor 14 enters debug mode when both synced debug entry request 27 is asserted at the output of debug control 18 and an asserted synced debug entry request 25 is received by debug control 18, as illustrated by arrow 108. Therefore, in this example, each of the processors, rather than waiting for the synced DR to be asserted in addition to receiving an asserted synced debug entry request from the other processor to enter debug mode, each of the processors waits until it has asserted its synced debug entry request to be provided to the other processor in addition to receiving the asserted synced debug entry request from the other processor. Thus, both processors remain in sync in this example as well, without loss of lockstep. Therefore, through the use of the synced debug entry request signals, lockstep can be maintained.

Figure 10:
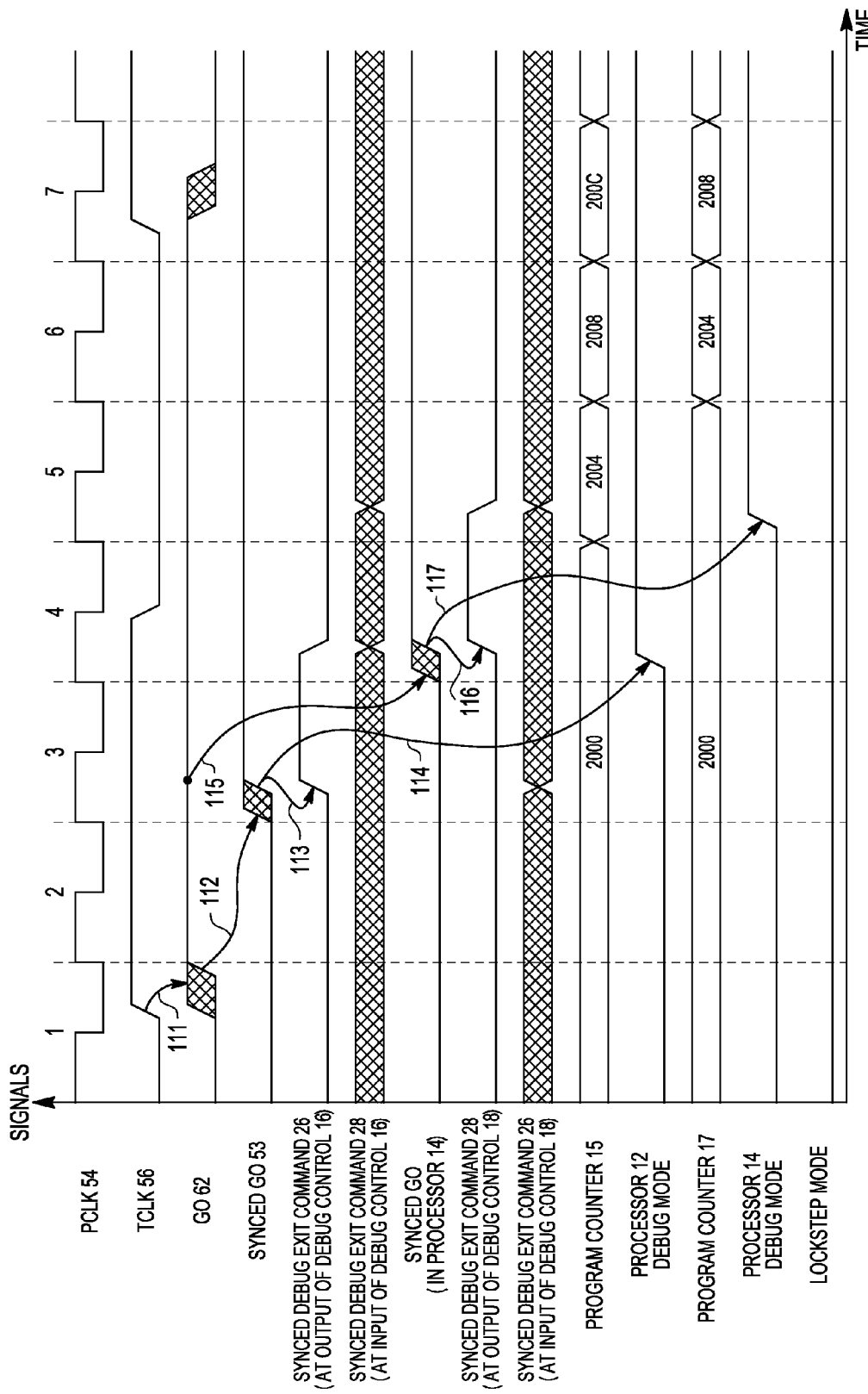
FIG. 10 illustrates a timing diagram of various signals of FIG. 1 or FIG. 2 in accordance with one example of debug exit signaling in a non-lockstep mode.

FIG. 10 illustrates an example timing for exiting debug mode with lockstep operation disabled. Therefore, the last signal in FIG. 10, lockstep mode, is negated. In this example, exit from debug mode is requested by the assertion of GO 62 (where, the GO bit of processor 14 may also be simultaneously asserted). The assertion of GO 62 occurs during cycle 1 in response to a rising edge of TCLK 56, as illustrated by arrow 111. At this point, GO 62 is asynchronous with respect to PCLK 54. GO 62 is then synchronized to PCLK 54 (by synchronization circuitry 48), resulting in synced GO 53 in cycle 3, illustrated by arrow 112. Control circuitry 43, in response to the assertion of synced GO 53, asserts synced debug exit command 26 (which is output from debug control 16) later in cycle 3, as illustrated by arrow 113. Also, in response to assertion of synced GO 53, processor 12, in cycle 4, exits debug mode, as illustrated by arrow 114, and begins instruction processing, as can be seen by the sequence of program counter values 2000, 2004, etc. As described above, since the relationship between PCLK 54 and TCLK 56 is not fixed, it is possible for the synchronized versions of GO (synced GO) to differ in processor 12 and 14. Therefore, even though the GO bit of processor 14 may be set simultaneous to GO 62, synced GO of processor 14 may not be output by the synchronization circuitry of processor 14 until cycle 4, as illustrated by arrow 115, which is one cycle later than when synced GO 53 was provided in processor 12. Later in cycle 4, as illustrated by arrow 116, the control circuitry of processor 14 asserts synced debug exit command 28 (at the output of debug control 18). Also, in response to assertion of the synced GO in cycle 4, processor 14, in cycle 5, enters debug mode, as illustrated by arrow 117. Therefore, note that, in this example, processor 14 exits debug mode one cycle later than processor 12. However, since lockstep mode is not enabled, the interface signal at the input of debug control 16 (synced debug exit command 28) and the interface signal at the input of debug control 18 (synced debug exit command 26) are ignored, and thus do not condition exit from debug mode by the processors. Therefore, the program counter of each processor end up with different values (as can be seen in cycles 6 and 7), thus processors 12 and 14 are now out of sync.

Figure 11:
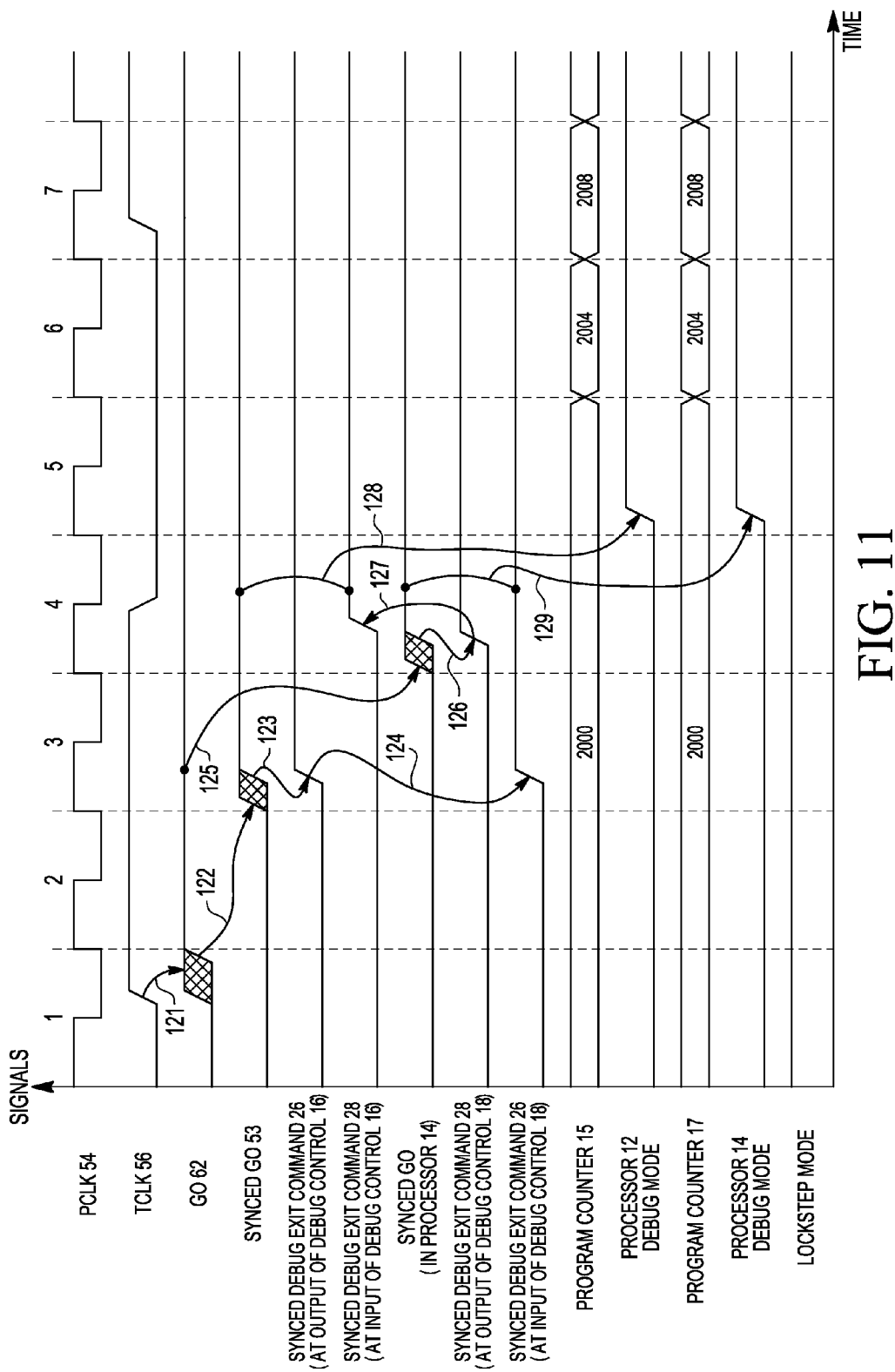
FIG. 11 illustrates a timing diagram of various signals of FIG. 1 or FIG. 2 in accordance with one example of debug exit signaling in a lockstep mode.

FIG. 11 illustrates an example timing for exiting debug mode with lockstep operation enabled. Therefore, the last signal in FIG. 11, lockstep mode, is asserted. In this example, exit from debug mode is requested by the assertion of GO 62 (where, the GO bit of processor 14 may also be simultaneously asserted). The assertion of GO 62 occurs during cycle 1 in response to a rising edge of TCLK 56, as illustrated by arrow 121. At this point, GO 62 is asynchronous with respect to PCLK 54. GO 62 is then synchronized to PCLK 54 (by synchronization circuitry 48), resulting in synced GO 53 in cycle 3, illustrated by arrow 122. Control circuitry 43, in response to the assertion of synced GO 53, asserts synced debug exit command 26 (which is output from debug control 16) later in cycle 3, as illustrated by arrow 123. This assertion of synced debug exit command 26 then propagates to the input of debug control 18, as illustrated by arrow 124. As described above, since the relationship between PCLK 54 and TCLK 56 is not fixed, it is possible for the synchronized versions of GO (synced GO) to differ in processor 12 and 14. Therefore, even though the GO bit of processor 14 may be set simultaneous to GO 62, synced GO of processor 14 may not be output by the synchronization circuitry of processor 14 until cycle 4, as illustrated by arrow 125, which is one cycle later than when synced GO 53 was provided in processor 12. Later in cycle 4, as illustrated by arrow 126, the control circuitry of processor 14 asserts synced debug exit command 28 (at the output of debug control 18). This assertion of synced debug exit command 28 then propagates to the input of debug control 16, as illustrated by arrow 127.

Unlike in FIG. 10, in which processor 12 exits debug mode in cycle 4 in response to assertion of synced GO 53, processor 12 delays exit from debug mode until both assertion of synced GO 53 occurs and assertion of synced debug exit command 28 is received, as illustrated by arrow 128. Therefore, processor 12 delays exiting debug mode until cycle 5 rather than exiting in cycle 4 as was done in FIG. 10. Similarly, processor 14 exits debug mode when both assertion of its synced GO occurs and assertion of synced debug exit command 26 is received, as illustrated by arrow 129. Therefore, processor 14 also exits debug mode in cycle 5. Thus, both processors remain in sync, without loss of lockstep. Therefore, through the use of the synced debug exit command signals, lockstep can be maintained.

Figure 12:
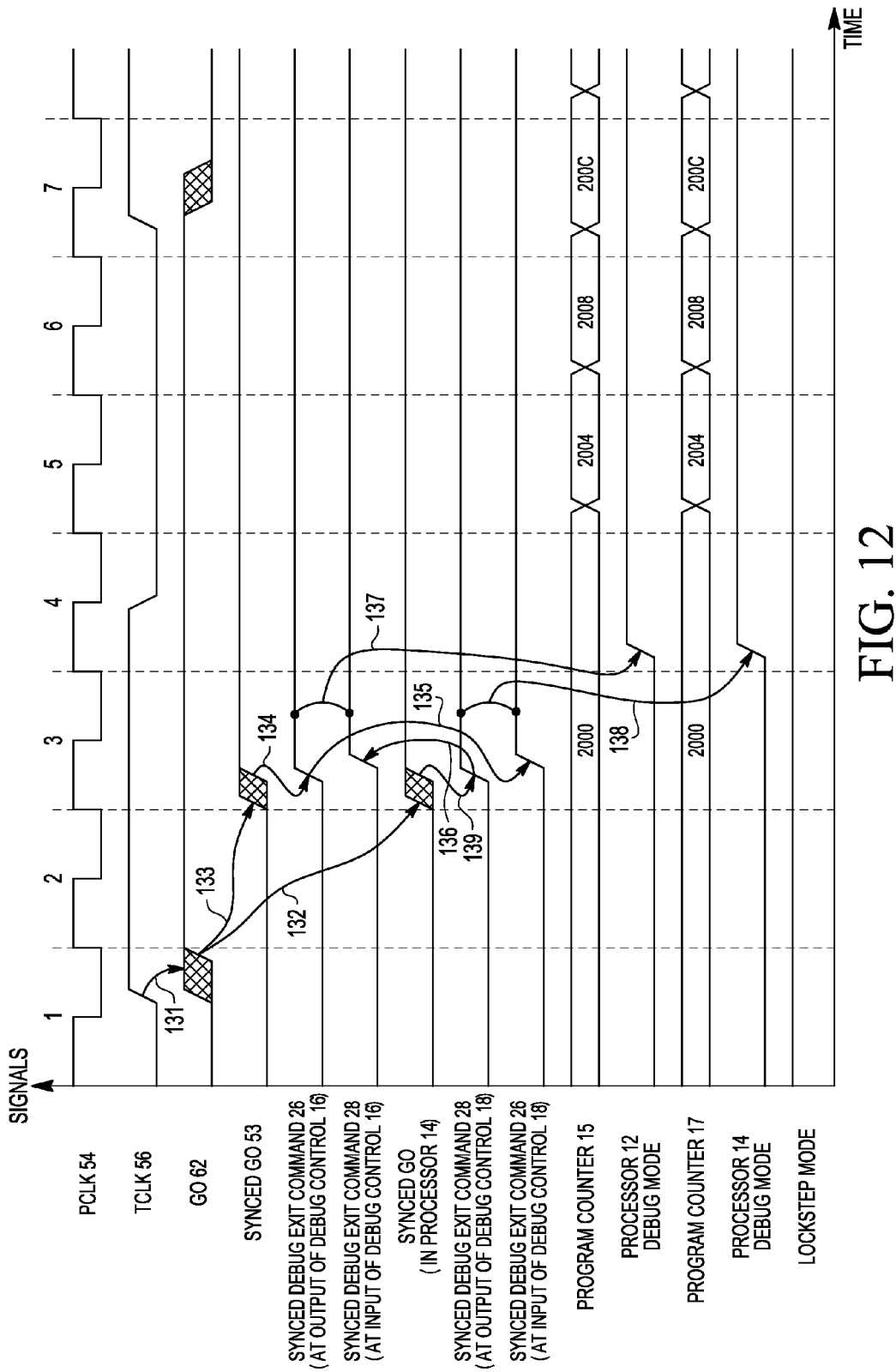
FIG. 12 illustrates a timing diagram of various signals of FIG. 1 or FIG. 2 in accordance with another example of debug exit signaling in a lockstep mode.

FIG. 12 illustrates another example timing for exiting debug mode with lockstep operation enabled. Therefore, the last signal in FIG. 12, lockstep mode, is asserted. In this example, exit from debug mode is requested by the assertion of GO 62 (where, the GO bit of processor 14 may also be simultaneously asserted). The assertion of GO 62 occurs during cycle 1 in response to a rising edge of TCLK 56, as illustrated by arrow 131. At this point, GO 62 is asynchronous with respect to PCLK 54. GO 62 is then synchronized to PCLK 54 (by synchronization circuitry 48), resulting in synced GO 53 in cycle 3, illustrated by arrow 133. Control circuitry 43, in response to the assertion of synced GO 53, asserts synced debug exit command 26 (which is output from debug control 16) later in cycle 3, as illustrated by arrow 134. This assertion of synced debug exit command 26 then propagates to the input of debug control 18, as illustrated by arrow 135. As described above, since the relationship between PCLK 54 and TCLK 56 is not fixed, it is possible for the synchronized versions of GO (synced GO) to differ in processor 12 and 14. However, in FIG. 12, the synced GO of processor 14 is also output by the synchronization circuitry of processor 14 in cycle 4, as illustrated by arrow 132. Later in cycle 3, as illustrated by arrow 139, the control circuitry of processor 14 asserts synced debug exit command 28 (at the output of debug control 18). This assertion of synced debug exit command 28 then propagates to the input of debug control 16, as illustrated by arrow 136.

Still referring to FIG. 12, processor 12 exits debug mode when both synced debug exit command 26 is asserted at the output of debug control 16 and an asserted synced debug exit command 28 is received by debug control 16, as illustrated by arrow 137. Similarly, processor 14 exits debug mode when both synced debug exit command 28 is asserted at the output of debug control 18 and an asserted synced debug exit command 26 is received by debug control 18, as illustrated by arrow 138. Therefore, in this example, each of the processors, rather than waiting for the synced GO to be asserted in addition to receiving an asserted synced debug exit command from the other processor to exit debug mode, each of the processors waits until it has asserted its synced debug exit command to be provided to the other processor in addition to receiving the asserted synced debug exit command from the other processor. Thus, both processors remain in sync in this example as well, without loss of lockstep. Therefore, through the use of the synced debug exit command signals, lockstep can be maintained.

Therefore, it should now be understood how the use of cross-signaling may be used to ensure that processors within a system which are operating in lockstep mode can enter and exit debug mode without the loss of lockstep. In this manner, even through the entering and exiting of debug mode, multiple processors in a system can remain in sync.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, other modules 22, if any, may be located on a same integrated circuit as processors 12 and 14 or on a separate integrated circuit or located within another peripheral or slave discretely separate from other elements of system 10.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a system including a first processor, a second processor, a first clock coupled to the first processor, a second clock coupled to the second processor, and a third clock coupled to the first processor and to the second processor. The first processor includes debug circuitry coupled to receive the third clock, synchronization circuitry coupled to receive the first clock, the synchronization circuitry receiving a first request to enter a debug mode and providing a first synced debug entry request signal, and an input for receiving a second synced debug entry request signal from the second processor. The first synced debug entry request signal is synchronized with respect to the first clock, and the first processor waits to enter the debug mode until the first synced debug entry request signal and the second synced debug entry request signal are both asserted. Item 2 includes the system of item 1, wherein the third clock is asynchronous with respect to the first clock. Item 3 includes the system of item 2, wherein the third clock is asynchronous with respect to the second clock. Item 4 includes the system of item 1, wherein the debug circuitry comprises a debug request register bit, and wherein the first request to enter the debug mode is provided to the synchronization circuitry in response to the debug request register bit being asserted. Item 5 includes the system of item 1, wherein the first processor comprises a first program counter and the second processor comprises a second program counter, and wherein the first processor increments the first program counter and the second processor increments the second program counter at a same time when both the first processor and the second processor are in the debug mode. Item 6 includes the system of item 1, wherein the first processor and the second processor enter the debug mode and execute a same instruction in lockstep during the debug mode. Item 7 includes the system of item 1, wherein the first processor and the second processor enter the debug mode and execute a same instruction during the debug mode, and wherein execution of the same instruction by the first processor is skewed by ten or less cycles of the first clock as compared to execution of the same instruction by the second processor. Item 8 includes the system of item 1, wherein the synchronization circuitry receives a request to exit a debug mode from the debug circuitry and provides a first synced debug exit command signal, wherein the first synced debug exit command signal is synchronized with respect to the first clock, and wherein the first processor further includes a first output for transferring the first synced debug entry request signal from the first processor to the second processor, a second output for transferring the first synced debug exit command signal from the first processor to the second processor, and an input for receiving a second synced debug exit command signal from the second processor, wherein the first processor waits to exit the debug mode until the first synced debug exit command signal and the second synced debug exit command signal are both asserted. Item 9 includes the system of item 1, wherein the second processor includes debug circuitry coupled to receive the third clock, synchronization circuitry coupled to receive the second clock where the synchronization circuitry receives a second request to enter the debug mode and providing the second synced debug entry request signal to the first processor, and an input for receiving the first synced debug entry request signal from the first processor. Item 10 includes the system of item 9, wherein the second processor waits to enter the debug mode until the first synced debug entry request signal and the second synced debug entry request signal are both asserted.

Item 11 includes a method which includes clocking a first portion of debug circuitry using a first clock; clocking a second portion of debug circuitry using a second clock, wherein the first clock is asynchronous with respect to the second clock; transferring a first request to enter a debug mode from the first portion of debug circuitry to synchronization circuitry, wherein the first request to enter the debug mode is asynchronous with respect to the second clock; the first processor synchronizing the first request to enter the debug mode with the second clock to produce a first synced debug entry request; the first processor monitoring a second synced debug entry request being received from the second processor; and the first processor waiting to enter the debug mode until the first synced debug entry request and the second synced debug entry request are both asserted. Item 12 includes the method of item 11 and further includes transferring the first synced debug entry request from the first processor to a second processor. Item 13 includes the method of item 11 and further includes enabling lockstep operation for the first processor and the second processor, wherein the lockstep operation comprises executing a same instruction in the first processor and the second processor during the debug mode. Item 14 includes the method of item 11 and further includes transferring a request to exit a debug mode from the first portion of debug circuitry to synchronization circuitry, wherein the request to exit the debug mode is asynchronous with respect to the second clock; the first processor synchronizing the request to exit the debug mode with the second clock to produce a first synced debug exit command; the first processor monitoring a second synced debug exit command being received from the second processor; and the first processor waiting to exit the debug mode until the first synced debug exit command and the second synced debug exit command are both asserted. Item 15 includes the method of item 11 and further includes the second processor synchronizing a second request to enter the debug mode with a third clock to produce the second synced debug entry request, wherein the first clock is asynchronous with respect to the third clock. Item 16 includes the method of item 15, wherein the second clock and the third clock are asynchronous. Item 17 includes the method of item 15 and further includes before entering the debug mode, the second processor monitoring the first synced debug entry request being received from the first processor, and the second processor executing one or more instructions in the debug mode after the first synced debug entry request and the second synced debug entry request are both asserted. Item 18 includes the method of item 11, wherein the first processor and the second processor are formed on a same integrated circuit.

Item 19 includes a method which includes inputting a test clock to a first processor and to a second processor; inputting a first processor clock to the first processor; inputting a second processor clock to the second processor, wherein the test clock is asynchronous with respect to the first processor clock and wherein the test clock is asynchronous with respect to the second processor clock; the first processor receiving a first request to enter a debug mode; the second processor receiving the request to enter the debug mode, wherein the first request to enter the debug mode and the second request to enter the debug mode are synchronous with the test clock; the first processor synchronizing the first request to enter the debug mode with respect to the first processor clock to produce a first synced debug entry request; the second processor synchronizing the request to enter the debug mode with respect to the processor clock to produce a second synced debug entry request; the first processor receiving the second synced debug entry request from the second processor and using the second synced debug entry request to determine when to enter debug mode; and the second processor receiving the first synced debug entry request from the first processor and using the first synced debug entry request to determine when to enter debug mode. Item 20 includes the method of item 19, wherein the first processor waits until both the first synced debug entry request and the second synced debug entry request are asserted before entering the debug mode, and wherein the second processor waits until both the second synced debug entry request and the first synced debug entry request are asserted before entering the debug mode.

What is claimed is:
1. A system comprising:
a first processor;
a second processor;
a first clock coupled to the first processor;
a second clock coupled to the second processor; and
a third clock coupled to the first processor and to the second processor, wherein the third clock is asynchronous with respect to the first clock,
wherein the first processor comprises:
debug circuitry coupled to receive the third clock;
synchronization circuitry coupled to receive the first clock, the synchronization circuitry receiving a first request to enter a debug mode which is synchronous with respect to the third clock and providing a first synced debug entry request signal,
wherein the first synced debug entry request signal is synchronized with respect to the first clock; and
an input for receiving a second synced debug entry request signal from the second processor,
wherein the first processor waits to enter the debug mode until the first synced debug entry request signal and the second synced debug entry request signal are both asserted.

2. The system of claim 1, wherein the third clock is asynchronous with respect to the first clock.

3. The system of claim 2, wherein the third clock is asynchronous with respect to the second clock.

4. The system of claim 1, wherein the debug circuitry comprises a debug request register bit, and wherein the first request to enter the debug mode is provided to the synchronization circuitry in response to the debug request register bit being asserted.

5. The system of claim 1, wherein the first processor comprises a first program counter and the second processor comprises a second program counter, and wherein the first processor increments the first program counter and the second processor increments the second program counter at a same time when both the first processor and the second processor are in the debug mode.

6. The system of claim 1, wherein the first processor and the second processor enter the debug mode and execute a same instruction in lockstep during the debug mode.

7. The system of claim 1, wherein the first processor and the second processor enter the debug mode and execute a same instruction during the debug mode, wherein execution of the same instruction by the first processor is skewed by ten or less cycles of the first clock as compared to execution of the same instruction by the second processor.

8. The system of claim 1, wherein the synchronization circuitry receives a request to exit a debug mode from the debug circuitry and provides a first synced debug exit command signal, wherein the first synced debug exit command signal is synchronized with respect to the first clock, and wherein the first processor further comprises:
a first output for transferring the first synced debug entry request signal from the first processor to the second processor;
a second output for transferring the first synced debug exit command signal from the first processor to the second processor; and
an input for receiving a second synced debug exit command signal from the second processor,
wherein the first processor waits to exit the debug mode until the first synced debug exit command signal and the second synced debug exit command signal are both asserted.

9. A system as in claim 1, wherein the second processor comprises:
debug circuitry coupled to receive the third clock;
synchronization circuitry coupled to receive the second clock, the synchronization circuitry receiving a second request to enter the debug mode and providing the second synced debug entry request signal to the first processor; and
an input for receiving the first synced debug entry request signal from the first processor.

10. A system as in claim 9, wherein the second processor waits to enter the debug mode until the first synced debug entry request signal and the second synced debug entry request signal are both asserted.

11. A method comprising:
clocking a first portion of debug circuitry using a first clock;
clocking a second portion of debug circuitry using a second clock,
wherein the first clock is asynchronous with respect to the second clock;
transferring a first request to enter a debug mode from the first portion of debug circuitry to synchronization circuitry,
wherein the first request to enter the debug mode is asynchronous with respect to the second clock;
a first processor synchronizing the first request to enter the debug mode with the second clock to produce a first synced debug entry request;
the first processor monitoring a second synced debug entry request being received from the second processor; and
the first processor waiting to enter the debug mode until the first synced debug entry request and the second synced debug entry request are both asserted.

12. A method as in claim 11, further comprising:
transferring the first synced debug entry request from the first processor to a second processor.

13. A method as in claim 12, further comprising:
enabling lockstep operation for the first processor and the second processor,
wherein the lockstep operation comprises executing a same instruction in the first processor and the second processor during the debug mode.

14. A method as in claim 11, further comprising:
transferring a request to exit a debug mode from the first portion of debug circuitry to synchronization circuitry,
wherein the request to exit the debug mode is asynchronous with respect to the second clock;
the first processor synchronizing the request to exit the debug mode with the second clock to produce a first synced debug exit command;
the first processor monitoring a second synced debug exit command being received from the second processor; and
the first processor waiting to exit the debug mode until the first synced debug exit command and the second synced debug exit command are both asserted.

15. A method as in claim 12, further comprising:
the second processor synchronizing a second request to enter the debug mode with a third clock to produce the second synced debug entry request,
wherein the first clock is asynchronous with respect to the third clock.

16. A method as in claim 15, wherein the second clock and the third clock are asynchronous.

17. A method as in claim 15, further comprising:
before entering the debug mode, the second processor monitoring the first synced debug entry request being received from the first processor; and
the second processor executing one or more instructions in the debug mode after the first synced debug entry request and the second synced debug entry request are both asserted.

18. A method as in claim 11, wherein the first processor and the second processor are formed on a same integrated circuit.

19. A method comprising:
inputting a test clock to a first processor and to a second processor;
inputting a first processor clock to the first processor;
inputting a second processor clock to the second processor, wherein the test clock is asynchronous with respect to the first processor clock, and wherein the test clock is asynchronous with respect to the second processor clock;

the first processor receiving a first request to enter a debug mode;

the second processor receiving a second request to enter the debug mode, wherein the first request to enter the debug mode and the second request to enter the debug mode are synchronous with the test clock;

the first processor synchronizing the first request to enter the debug mode with respect to the first processor clock to produce a first synced debug entry request;

the second processor synchronizing the second request to enter the debug mode with respect to the second processor clock to produce a second synced debug entry request;

the first processor receiving the second synced debug entry request from the second processor and using the second synced debug entry request to determine when to enter debug mode; and the second processor receiving the first synced debug entry request from the first processor and using the first synced debug entry request to determine when to enter debug mode.

20. A method as in claim 19, wherein the first processor waits until both the first synced debug entry request and the second synced debug entry request are asserted before entering the debug mode, and wherein the second processor waits until both the second synced debug entry request and the first synced debug entry request are asserted before entering the debug mode.

* * * * *